United States Patent
Feller

(10) Patent No.: US 7,571,655 B1
(45) Date of Patent: Aug. 11, 2009

(54) MAGNETIC FLOW METER WITH BUFFERING ELECTRODES

(76) Inventor: Murray F Feller, 21577 NW. 75th Avenue Rd., Micanopy, FL (US) 32667

( * ) Notice: Subject to any disclaimer, the term of this patent is extended or adjusted under 35 U.S.C. 154(b) by 0 days.

(21) Appl. No.: 12/325,016

(22) Filed: Nov. 28, 2008

(51) Int. Cl.
*G01F 1/58* (2006.01)
(52) U.S. Cl. .................... 73/861.12; 73/861.15
(58) Field of Classification Search .......... None
See application file for complete search history.

(56) References Cited

U.S. PATENT DOCUMENTS 4,408,497 A * 10/1983 Suzuki ............... 73/861.17
5,935,077 A * 8/1999 Ogle ................. 600/504
6,571,642 B1 * 6/2003 Feller ................ 73/861.12

FOREIGN PATENT DOCUMENTS

JP 02099829 A * 4/1990

* cited by examiner

*Primary Examiner*—Harshad Patel
(74) *Attorney, Agent, or Firm*—David Kiewit

(57) ABSTRACT

The flow responsive voltages detected at the electrodes of magnetic flow meters are typically reduced in magnitude by an electrical impedance shunting effect of the fluid on the electrodes. This problem is resolved by providing buffering electrodes located near, and preferably both upstream and downstream, of flow responsive sensing electrodes. The buffering electrodes are driven by amplifiers having signals detected by the flow responsive electrodes as an input. Thus, fluid in the vicinity of the flow responsive electrodes is forced to acquire an offset voltage which can reduce the shunting effect to a negligible level.

16 Claims, 3 Drawing Sheets

MAGNETIC FLOW METER WITH BUFFERING ELECTRODES

BACKGROUND OF THE INVENTION

1. Field of the Invention

This invention relates to apparatus and method for determining the rate of flow by a magnetic flow meter that measures an electrical potential difference developed in the fluid as the fluid moves through a magnetic field.

2. Background Information

In most prior art in-line magnetic flow meters, the electrical potential difference developed in the fluid is sensed by a pair of electrodes contacting the fluid and spaced apart from each other by the diameter of a round flow sensing passage containing the fluid. A magnetic field orthogonal to both the line between the electrodes and the direction of flow through the sensing passage is commonly provided by two coils of wire located on opposite sides of and outside the passage. Sophisticated electronics are used to energize the coils to generate the magnetic field, to amplify the tiny flow-related signals generated, and to reject various noise and drift signal components which would otherwise degrade measurement accuracy. These meters are characterized by an unobstructed flow passage offering very low pressure drop and high tolerance to solids in the fluid, high measurement precision, high power consumption and high cost.

In his U.S. Pat. No. 6,571,642 and in his pending patent application Ser. No. 12/206,881, the disclosures of which are herein incorporated by reference, the inventor taught in-line magnetic flow meters providing an extended flow sensing path between paired sensing electrodes. These meters also have a more efficient magnetic circuit which produces higher flow-generated signals. The extended path was configured as a quasi-annulus formed by partially or completely obstructing the central part of the fluid flow path. Although this arrangement increases the pressure drop caused by the meter, it also provides a higher measurement precision, and lower power consumption due to the longer sensing path and the more efficient magnetic circuit.

The flow responsive voltages detected at the electrodes of prior art magnetic flow meters are typically reduced in magnitude, to at least some extent, by the electrical impedance shunting effect of the fluid on the electrodes. This usually occurs because the voltage generated in the fluid a short distance from the electrodes is generally lower than that sensed by the electrodes. This situation arises because the magnetic field is usually centered on the electrodes and has a strength that falls off with distance away from those electrodes. Straightforward approaches of making the magnetic field more uniform over a larger area generally increase power requirement, coil size, etc. Thus, magnetic flow meters would benefit from an arrangement that reduces shunt loading at the sensing electrodes without exacting a penalty of substantially increased power consumption.

BRIEF SUMMARY OF THE INVENTION

In a preferred embodiment for improving a magnetic flow meter, buffering electrodes are located adjacent, and preferably both upstream and downstream, of the flow responsive sensing electrodes. The buffering electrodes are driven by amplifiers preferably having their input signals derived from signals detected by the flow responsive electrodes. Thus, fluid in the vicinity of the flow responsive electrodes is forced to acquire a buffer or offset voltage which can reduce the shunting effect to a negligible level. The theory of operation is analogous to using a driven shield in an input cable of an amplifier, where the shield is driven by a similarly amplified input signal to reduce input loading, particularly capacitance loading. Another example would be the use of guard rails on printed circuit boards to reduce the effects of surface leakage on high impedance circuits.

An aspect of the invention is that it provides a magnetic flow sensor for measuring the rate of flow of a fluid along a flow direction. The preferred sensor comprises a pair of sensing electrodes and an interposed obstructing body that extends a sensing path beyond what it would have been if the obstructing body was removed, and that, in particularly preferred embodiments, is quasi-annular. Each pair of sensing electrodes, when wetted by the fluid, define a sensing path through the fluid transverse to the flow direction. Each of the sensing electrodes is connected to a signal processing circuit operable to provide a flow signal representative of a flow-induced voltage between the sensing electrodes. Each of these sensing electrodes has at least one buffer electrode associated with it. Preferably each sensing electrode has a pair of buffer electrodes associated with it. Each preferred buffer electrode is connected to an output of the signal processing circuit operable to provide the buffer electrode with a buffer or offset voltage that varies with the voltage of its associated sensing electrode.

Another aspect of the invention is that it provides a method of compensating for parasitic impedance effects in a magnetic flow meter. This method comprises the steps of: providing a magnetic flow meter having at least one pair of sensing electrodes wetted by the fluid when the fluid is present; providing at least one buffer electrode respectively associated with each sensing electrode; causing the fluid to flow through the magnetic flow meter and to thereby induce a respective flow responsive voltage at each sensing electrode; generating a respective offset voltage responsive to the voltage at each sensing electrode; and applying the respective offset voltage to the respective buffer electrodes. In preferred arrangements, at least a respective pair of buffer electrodes is associated with each sensing electrode.

Yet another aspect of the invention is that the fluid shunting effect is reduced or essentially eliminated by the use of additional buffering electrodes associated with sensing electrodes.

A further aspect of the invention is that it enables a given magnetic flow meter to have higher flow responsive voltages produced for a selected magnetic field strength.

A still further aspect of the invention is that it compensates for magnetic field imhomogeneities in a magnetic flow meter and thereby allows a more efficient magnetic circuit to be utilized. The more efficient circuit concentrates flux in a smaller area for generating a greater output from flow-sensing electrodes.

Still another aspect of the invention is that in some magnetic flow meter configurations, the buffering electrodes may also compensate for signal attenuation resulting from short circuiting of the flow responsive signal to electrically conductive mechanical components of the meter.

The use of buffering electrodes in a magnetic flow meter having multiple pairs of sensing electrodes, as described in the inventor's U.S. Pat. No. 6,571,642 may also compensate for a shunting effect that occurs when the pairs of sensing electrodes are in close proximity to each other. This compensation can allow for a reduction in length of a sensing portion of a magnetic flow meter, which can substantially reduce the overall cost of the meter. This is particularly true when dealing with large pipe diameters.

Buffering electrodes can also be used to compensate, at least in part, for impedance loading from the measured fluid, and from the sensing electrodes, their cabling and circuitry. Thus, the inventive approach can reduce sensing errors when flow of low conductivity fluids is measured.

Although it is believed that the foregoing rather broad summary description may be of use to one who is skilled in the art and who wishes to learn how to practice the invention, it will be recognized the foregoing recital is not intended to list all of the features and advantages. Those skilled in the art will appreciate that they may readily use both the underlying ideas and the specific embodiments disclosed in the following Detailed Description as a basis for designing other arrangements for carrying out the same purposes of the invention and that such equivalent constructions are within the spirit and scope of the invention in its broadest form. Moreover, it may be noted that different embodiments of the invention may provide various combinations of the recited features and advantages of the invention, and that less than all of the recited features and advantages may be provided in some embodiments.

DETAILED DESCRIPTION OF A PREFERRED EMBODIMENT

Although this invention is generally applicable to magnetic flow meters, it is described herein in the context of flow meters having a quasi-annular sensing region, as described by the inventor in his U.S. Pat. No. 6,571,642.

In studying this Detailed Description, the reader may be aided by noting the definitions of certain words and phrases used throughout this patent document. Whenever those definitions are provided, those of ordinary skill in the art should understand that in many, if not most instances, such definitions pertain to both preceding and following uses of such defined words and phrases. In particular, the terms "pipe", "meter body" and "tubular meter body" are used to describe an external portion of the meter of the invention and are distinguished from an optional inner, generally axially disposed portion of the meter body that is referred to as the "inner tube", "axial body" or "central body". This central body may be a "vane" or may be a body supported by a vane that is generally laminar in shape and that extends along the axis. In some embodiments the vane and whatever streamlined body it supports are axially coextensive, but the reader is cautioned to not hold this to be true of all vanes. A vane, as used herein, may be a solid body or a multi-walled structure having a hollow plenum in a central section for carrying electrical wires and the like. A vane may be integrally formed with a flow tube, or may be clamped, glued, welded, or otherwise fastened to the tube and to whatever streamlined body is present.

A problem that is resolved by the invention is discussed in terms of "parasitic impedances" that exist as distributed features within and surrounding a signal generating path and that reduce the sensing electrode signals by either shunting signals to an electrical ground or by adding an impedance connected in series between sensing electrodes. Moreover, the term "electrical ground" is used in a conventional sense to include both a local circuit reference voltage and an actual earth ground.

Figure 1:
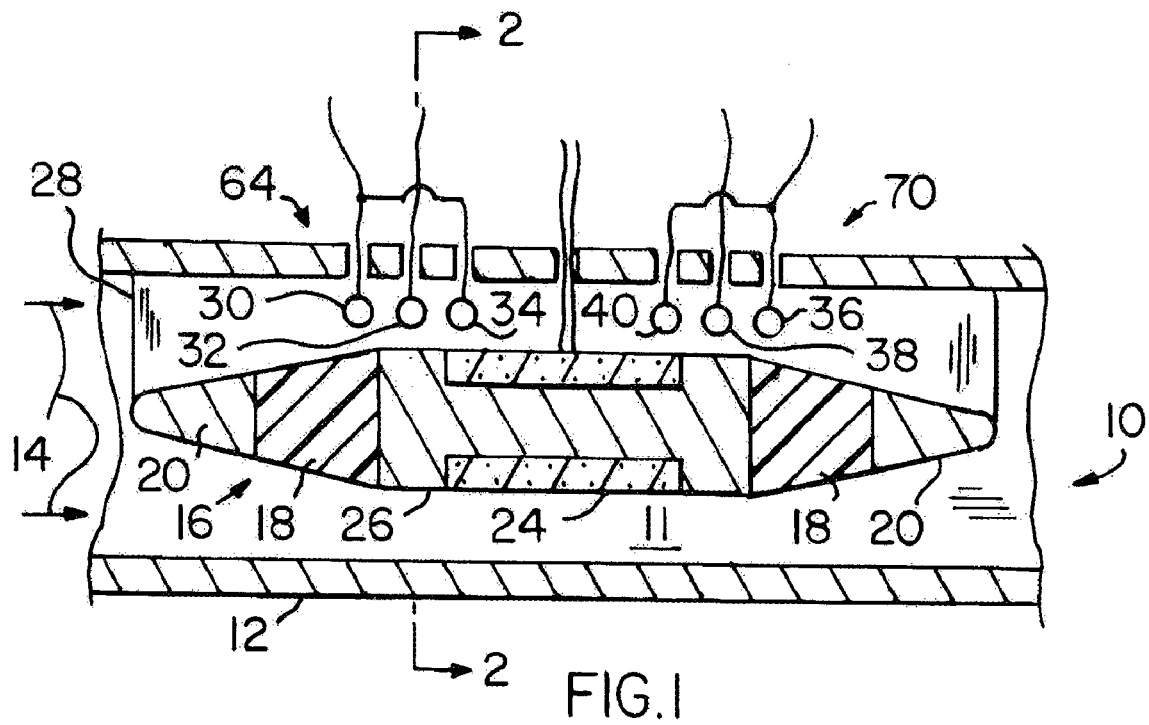
FIG. 1 is a partially schematic cross-sectional view of a sensing portion of a flow meter of the invention, where the plane of section includes a flow axis.
Figure 2:
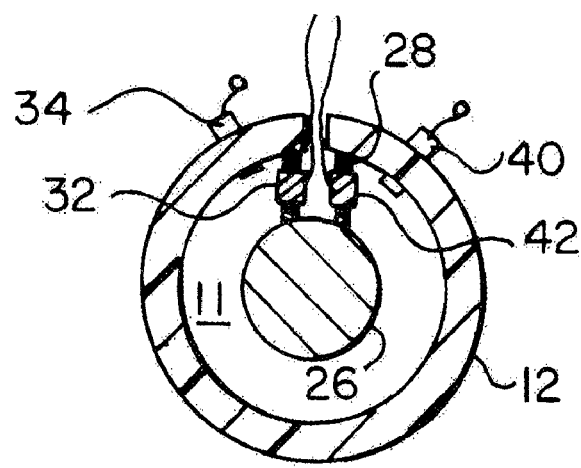
FIG. 2 is a partial cross-section of a sensing portion of a flow meter of the invention having buffer electrodes mounted in a housing wall, rather than in a vane as depicted in FIG. 1. The plane of section is through the sensing electrodes, as indicated by the double-headed arrow 2-2 in FIG. 1.

Turning now to FIG. 1, one finds a sensing portion 10 of a magnetic flow meter having a quasi-annular sensing path. This meter may be used to measure the flow of fluid 11 along the axis of the sensing portion 10 of the meter as indicated by the arrows 14. When compared with a meter made in accordance with the teachings of U.S. Pat. No. 6,571,642, the depicted arrangement can provide an increase in the magnitudes of flow responsive signals measured between paired sensing electrodes for a selected power consumption of the electromagnet coil 24 (FIG. 1 and FIG. 2 depict three such electrodes 32, 42, 38 and the reader will understand that only one electrode 38 of a downstream pair is shown, the other being hidden by the vane 28). Alternately, the depicted arrangement can provide the same flow responsive signals as did an earlier design that lacked buffer electrodes, but with a reduction in the power consumption of the electromagnet coil 24.

Figure 4:
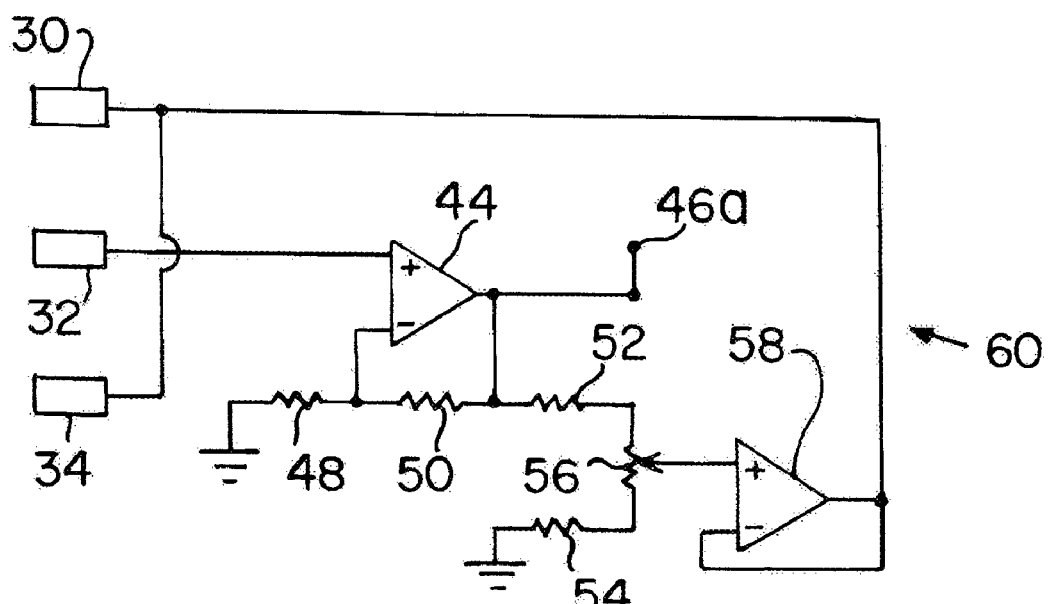
FIG. 4 is a partial schematic block diagram of a buffer electrode driver circuit portion of signal processing circuitry used in preferred embodiments of the invention.

In the depiction of FIG. 1 the meter housing 12 contains a streamlined body 16 comprising electrically conductive end pieces 20, insulating extenders 18, and a magnetic core 26. A vane 28 is used to attach the body 16 to the housing and to support the sensing electrodes 32, 42, 38. Upstream 30 and downstream 34 buffering electrodes are preferably mounted on each side of the upstream sensing electrode 32 and are electrically connected together, as depicted in FIG. 4. A corresponding pair of buffering electrodes 40, 36 is disposed upstream and downstream of a second pair of sensing electrode, only one of which 38 is depicted. On the opposite, hidden, side of the vane other pairs of buffer electrodes (not shown) surround the sensing electrodes.

In the embodiment of FIG. 1, conductive end pieces 20 are in contact with the fluid 11 to provide a signal ground or reference and the electrodes are conductive to provide an electrical connection to the fluid. This arrangement differs from some of the prior art in which all of the wetted surfaces other than the electrodes are made of electrically insulating materials.

In a preferred embodiment depicted in FIG. 1, the flow responsive signals are generated at sensing electrodes adjacent each end of the magnetic core 26. These signals have opposing polarities because the polarity of the magnetic field is reversed from one end of the coil to the other. By using the present invention to isolate the signal generating paths from each other, the related signal shunting is seriously reduced if not cancelled altogether. The core 26 may also be made shorter, enabling the meter size to be reduced with significant cost savings.

Although the buffering electrodes are depicted as being circular in cross-section, the reader will understand that can be variously shaped and may be elongated.

In the embodiment of FIG. 1, sensing 32, 38 and buffering electrodes 30, 34, 36, 40 are all depicted as being mounted on an electrically insulating support vane, although many other mounting arrangements are possible. For example, any of these electrodes can be positioned adjacent the vane and protruding through the pipe. The reader will recognize that mounting an electrode in a throughhole distal from the vane would generally reduce the length of the sensing path and thereby lead to a reduction in performance. Clearly, the maximum length of the sensing path is achieved when the sensing electrodes are mounted on opposite sides of the support vane 28, as depicted in FIG. 2.

Figure 3:
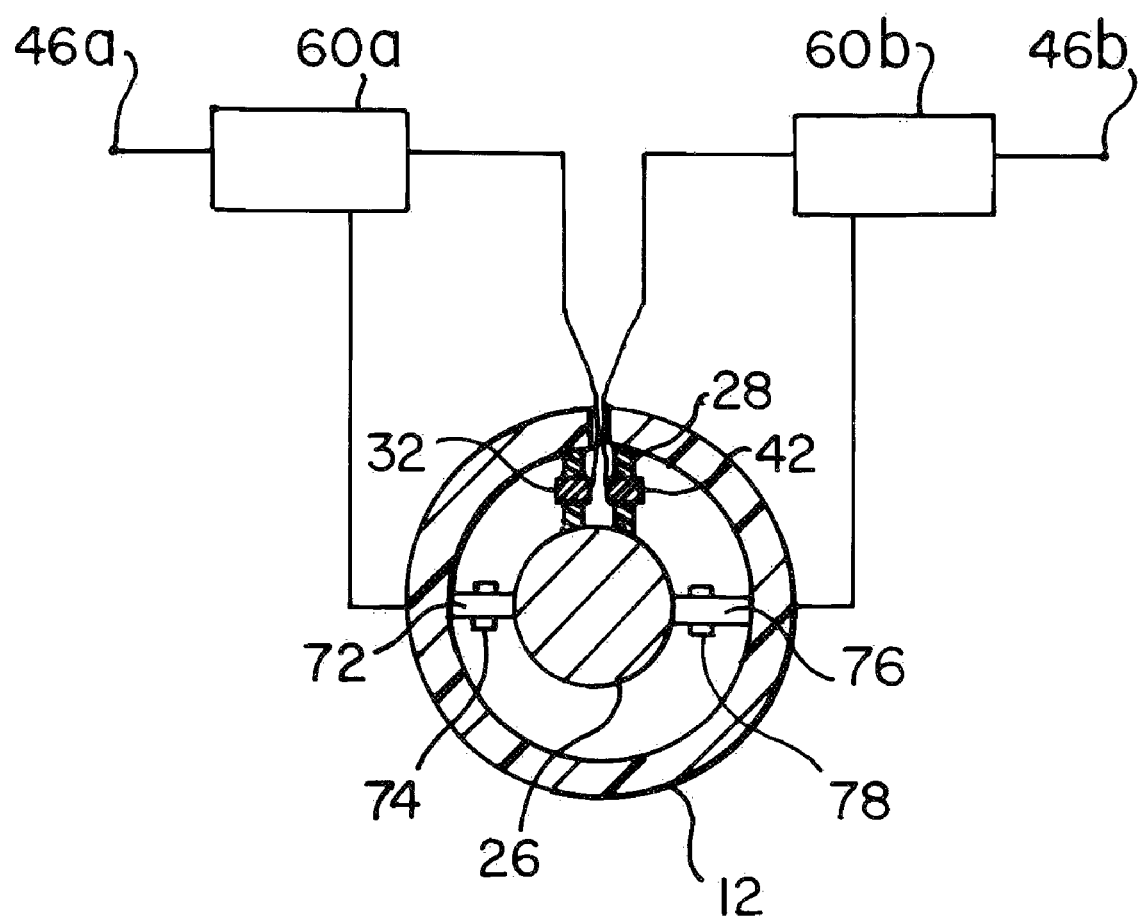
FIG. 3 is a partly schematic, partly cross-sectional view, similar to that of FIG. 2, of a sensing portion of a flow meter of the invention having buffer electrodes distributed along a quasi-annular sensing passage used for generating the flow responsive signals, where the depicted buffer electrodes are disposed in a plane downstream of the plane of section.

In preferred embodiments the buffering electrodes are located immediately upstream and downstream of the associated sensing electrodes. However, one can also configure a sensor having buffer electrodes distributed along a sensing passage used for generating the flow responsive signals. In the depiction of FIG. 3, buffering electrodes 74, 78 are disposed at selected locations adjacent to and along the length of an annular sensing path or passage. These electrodes may also be mounted on respective electrically insulated vanes 72, 76 separate from the vane 28 supporting the sensing electrodes. In order to provide a continuous annular sensing path, the vanes 72, 76 supporting the buffer electrodes may be located entirely upstream or downstream of the sensing electrodes, may have appropriate slots in them, or may comprise electrically conductive pins or other components as shown in the inventor's U.S. Ser. No. 12/206,881. Moreover, the buffer electrodes 74, 78 can also be held in place with insulated mountings attached to the sensing electrode vane 28, in throughholes through the housing 12, or by other means.

The function of the buffering electrodes is to compensate for the depression of the flow related signals in the sensing path due to shunting effects. These electrodes would typically be driven at a level corresponding to their location along a path to best recreate the flow responsive voltage that would be found at the sensing electrodes if no shunting effects were present. For a large meter with multiple annular sensing paths there is a benefit in making the meter as short as possible. This can be achieved by using sensing paths that are relatively narrow, as measured along the flow direction, and by providing a large number of buffering electrodes, where each electrode is driven with the compensating signal adjusted for its location along the path.

In FIG. 4, a simplified buffer control and driver circuit 60 is shown in which the flow responsive voltage sensed by one of the sensing electrodes 32 is routed to a signal amplifier 44 which has an output 46 to the flow signal processing circuits of a sort known in the art. The signal amplifier 44 is arranged as a positive gain circuit in which resistors 48, 50 have values selected both to establish the amplification gain factor of the amplifier 44 and to supply a voltage divider that may comprise several resistors 52, 54, 56. An adjustable tap from one of the resistors 56 preferably provides an input to a buffer amplifier 58. The adjustable tap enables the signal amplification factor of the input to the amplifier 58 to be adjusted so as to provide a range of amplification that may extend from less than to greater than unity in order to accommodate a wide range of conditions. Once the optimum adjustment has been determined for a particular meter configuration, the circuit may be simplified by various means, such as eliminating one of the resistors 56 and establishing the divider factor by using only two resistors 52, 54 having appropriately selected values.

The reader will note that other signal processing circuits may be used to drive the buffer electrode or electrodes. For example, a signal processing circuit could be formed by omitting the buffer amplifier 58 from FIG. 4 and applying an output voltage from the voltage divider to one or more buffer electrodes. This arrangement might be used, for example if the conductivity of the flowing fluid is relatively low compared to that of the voltage divider resistors. In another arrangement, the differential voltage between the sensing electrodes, which is responsive to fluid flow rate, could be used to provide the output.

Although FIG. 4 schematically depicts a preferred buffering arrangement having a pair of buffering electrodes 30, 34 associated with a particular one 32 of the sensing electrodes, it will be understood that each of the flow responsive electrodes may be similarly configured with respective buffering electrodes. Moreover, there is no requirement that the buffering electrodes be paired, with one being upstream and the other being downstream of a sensing electrode. One could use a single respective buffering electrode associated with each sensing electrode; or could provide buffering for only some sensing electrodes; or could use three or more buffering electrodes with each sensing electrode.

Although the amplifier circuit in FIG. 4 depicts only resistors and op amps, one could also include reactive components to compensate for parasitic capacitive impedances and buffer electrode connections made through DC blocking capacitors. This circuit and the electromagnet circuit preferably operate in a bipolar manner with respect to the fluid ground potential so as to cancel effects of electrode polarization.

During operation of the circuit of FIG. 4, each flow responsive electrode provides an input voltage to an amplifier circuit which then provides a signal to its associated upstream and downstream buffering electrodes. The buffering electrodes are provided with the voltage output by the buffer amplifier 58, which tracks the sensing electrode voltage at the output 46 of the signal amplifier 44. This provides a buffer or offset voltage in the fluid to cancel the effect of parasitic impedances. When the flow meter is configured so that the magnetic field is relatively uniform and covers a relatively large area, the shunting effect is relatively small and the amplification of the signal voltage applied to the buffering electrodes need only approximate that sensed by the signal amplifier 44. When the flow meter is configured with a relatively non-uniform magnetic field, the shunting effect will be comparatively large and the amplification of the voltage applied to the buffering electrodes will be substantially larger. Care needs to be exercised in not making the amplification too large as it constitutes a source of positive feedback which may cause unstable operation.

In one preferred embodiment the distributed buffer electrodes 74, 78 would be supplied as pairs of electrodes located on either side of the sensing path, as in FIG. 1. In an arrangement of this sort, each of the sensing electrodes provides an input signal to an associated buffer amplifier circuit 60a, 60b in order to provide amplified signals both for flow rate processing and for powering the buffering electrodes 74, 78.

Moreover, it may be noted that that the buffering electrodes can also be used to compensate, at least in part, for impedance loading that occurs when the flow of low conductivity fluids is measured. In this case, the use of buffering electrodes can reduce the overall sensing error.

Figure 5:
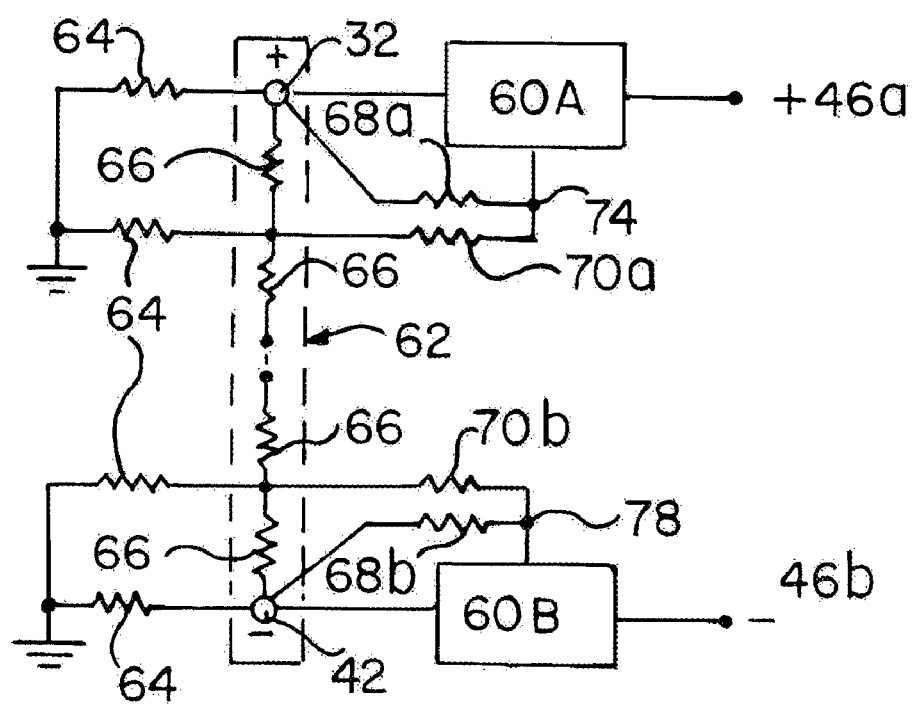
FIG. 5 is a schematic circuit showing parasitic impedances associated with a pair of sensing electrodes in a magnetic flow sensor.

An electrical equivalent circuit of parasitic impedances in a magnetic flow measurement arrangement is depicted in FIG. 5, where the magnetic circuit and signal processing circuitry are omitted in the interest of clarity of presentation. A flow responsive signal generating path 62 is shown along with parasitic shunt 64 and parasitic series 66 impedances that are depicted as lumped resistive elements in the interest of simplicity and clarity. The skilled reader will appreciate that shunt and series capacitances are similarly present and can also be significant factors affecting the electrode signals. These impedances exist as distributed entities within and surrounding the annular signal generating paths and reduce the electrode signals by shunting these signals to ground and by adding impedance between the electrodes and the signal generating means. The use of buffer control and driver circuits 60*a*, 60*b* provide compensating voltages from respective buffer amplifiers to the driven electrodes 74, 78 disposed near the annular signal generating paths. The impedances linking these buffer electrodes to other elements of the circuit are depicted in FIG. 5 as lumped series resistances 68*a*, 68*b* between the buffer electrodes 74, 78 and their associated sensing electrodes 32, 42; and as lumped resistances 70*a*, 70*b* between the buffer electrodes 74, 78 and the annular sensing path, including ground.

Buffer control and driver circuits, including multiple tap dividing circuits may be deployed at various locations around a preferred annular signal generating path, as described by the inventor in his U.S. Pat. No. 6,571,642. The buffer electrode voltages are adjusted, at each particular location in the path, to be an appropriate fraction of the sensing electrode voltage. This provides precise neutralization of the attenuating factors in the path. The driven electrodes are preferably located on either side of the sensing path—i.e., both upstream and downstream.

Although the present invention has been described with respect to a preferred embodiment many modifications and alterations can be made without departing from the invention. Accordingly, it is intended that all such modifications and alterations be considered as within the spirit and scope of the invention as defined in the attached claims.

The invention claimed is:

1. A magnetic flow sensor for measuring the rate of flow of a fluid along a flow direction, the sensor comprising: a pair of sensing electrodes that, when wetted by the fluid, define a sensing path through the fluid transverse to the flow direction; each of the sensing electrodes having at least one buffer electrode associated therewith; each of the sensing electrodes connected to an input of a signal processing circuit operable to provide, as separate outputs, a flow signal representative of a flow-induced voltage, and an input to a respective buffer amplifier operable to supply a respective buffer voltage to the associated at least one buffer electrode.

2. The flow sensor of claim 1 wherein the signal processing circuit comprises at least two amplifiers.

3. The flow sensor of claim 1 wherein the signal processing circuit comprises: a respective signal amplifier directly connected to each of the sensing electrodes; and a respective voltage divider connecting the output of each signal amplifier to the respective associated buffer amplifier operable to supply the respective buffer voltage.

4. The flow sensor of claim 1 further comprising an obstructing body disposed between the sensing electrodes of the pair thereof so as to extend a length of the sensing path beyond what it would be if the obstructing body were not present.

5. The flow sensor of claim 1 wherein each of the pair of sensing electrodes has a respective pair of buffer electrodes associated therewith, the sensor further comprising a second pair of sensing electrodes spaced apart from the first pair of sensing electrodes along the flow direction, each of the second pair of sensing electrodes having a respective pair of buffer electrodes associated therewith; the flow sensor further comprising a second signal processing circuit connected to the second pair of sensing electrodes and to a second buffer amplifier operable to supply a second buffer voltage to the second pair of buffer electrodes.

6. The flow sensor of claim 1 wherein at least one of the sensing electrodes has two or more buffer electrodes associated therewith.

7. The flow sensor of claim 1 further comprising a meter housing for containing the flowing fluid, the meter housing comprising a supporting vane extending from an interior wall of the housing toward an axis thereof, and wherein all of the electrodes are mounted on the supporting vane.

8. The flow sensor of claim 1 wherein the flow meter comprises a meter housing for containing the flowing fluid, the housing comprising a vane extending from an interior wall of the housing toward an axis thereof, and wherein at least one of the electrodes is not mounted on the vane.

9. A method of compensating for parasitic impedance effects in a magnetic flow meter comprising at least one pair of sensing electrodes that, when wetted by a fluid, define a sensing path through the fluid transverse to a flow direction; the method comprising the steps of:

providing at least one buffer electrode respectively associated with each sensing electrode;

causing the fluid to flow through the magnetic flow meter and to thereby induce a respective flow voltage at each sensing electrode;

connecting each sensing electrode to a signal processing circuit having an output to a respective buffer amplifier to generate a respective buffer voltage responsive to the associated flow voltage, and applying the respective buffer voltage to the respective at least one buffer electrode.

10. The method of claim 9 wherein the magnetic flow meter comprises a single pair of sensing electrodes, each having a respective single pair of buffer electrodes associated therewith, and wherein the buffer voltage respectively associated with each sensing electrode is applied to both associated buffer electrodes.

11. The method of claim 9 wherein each sensing electrode has associated therewith a respective pair of buffer electrodes wherein one buffer electrode of each pair is disposed upstream from the associated sensing electrode and the other buffer electrode is disposed downstream from the associated sensing electrode.

12. The method of claim 9 wherein each sensing electrode is connected through a respective signal amplifier to the respective buffer amplifier.

13. A method of measuring the rate of flow of a fluid along a flow direction by operating a magnetic flow meter comprising at least one pair of sensing electrodes that, when wetted by a fluid, define a sensing path through the fluid transverse to a flow direction; the method comprising the steps of:

providing at least one buffer electrode respectively associated with each sensing electrode;

causing the fluid to flow through the magnetic flow meter and to thereby induce a respective flow voltage at each sensing electrode;

producing a respective buffer voltage responsive to each flow voltage by connecting the associated sensing electrode to an input of a buffer amplifier; and connecting an output of the buffer amplifier to the respective at least one buffer electrode.

14. The method of claim 13 wherein the magnetic flow meter comprises a single pair of sensing electrodes, each having a respective single pair of buffer electrodes associated therewith, and wherein the buffer voltage respectively associated with each sensing electrode is applied to both associated buffer electrodes.

15. The method of claim 13 wherein each pair of buffer electrodes comprises one buffer electrode disposed upstream from the associated sensing electrode and another buffer electrode disposed downstream from the associated sensing electrode.

16. The method of claim 13 wherein each sensing electrode is connected through a respective signal amplifier to the respective buffer amplifier.

* * * * *